UNITED STATES PATENT OFFICE.

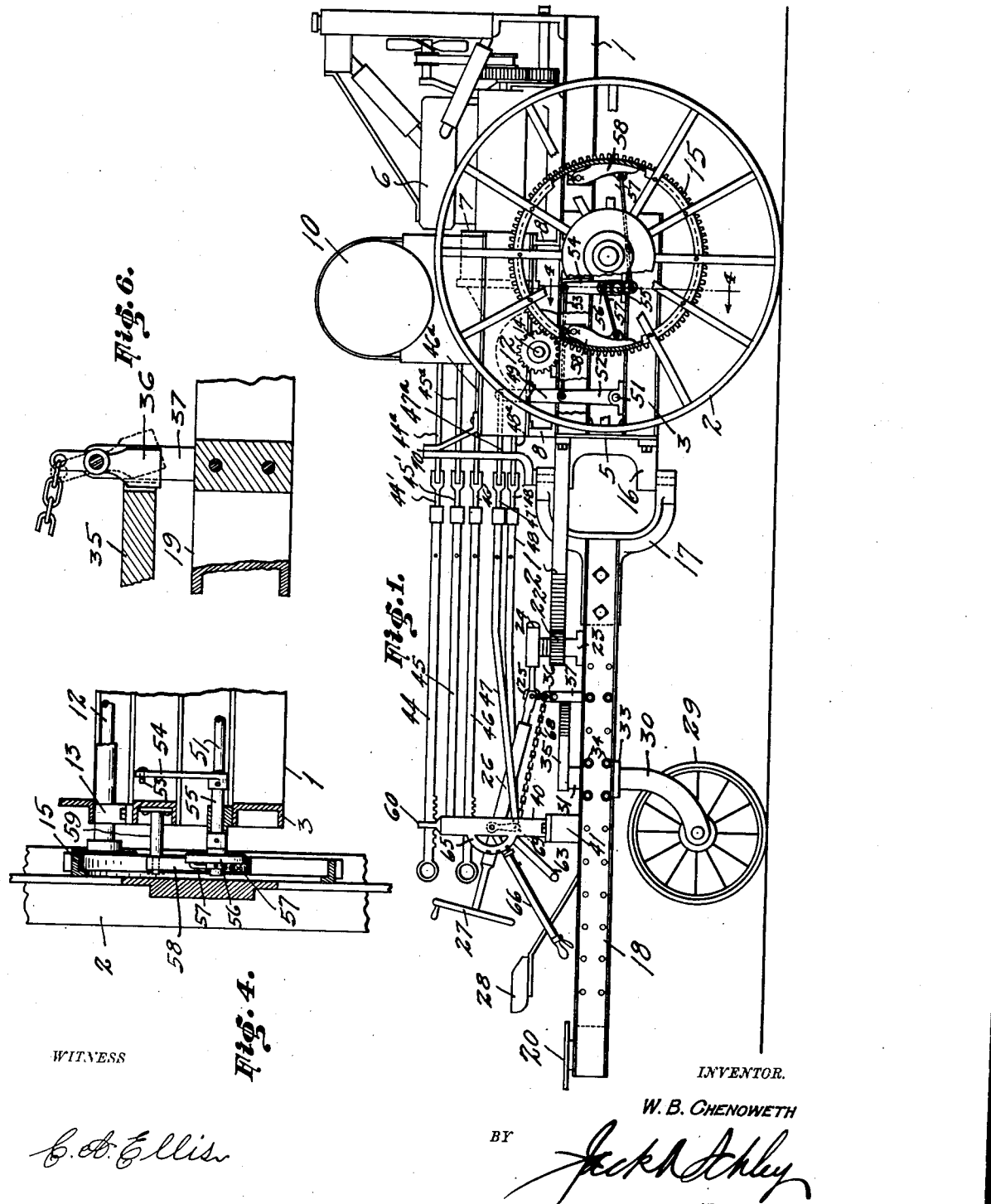

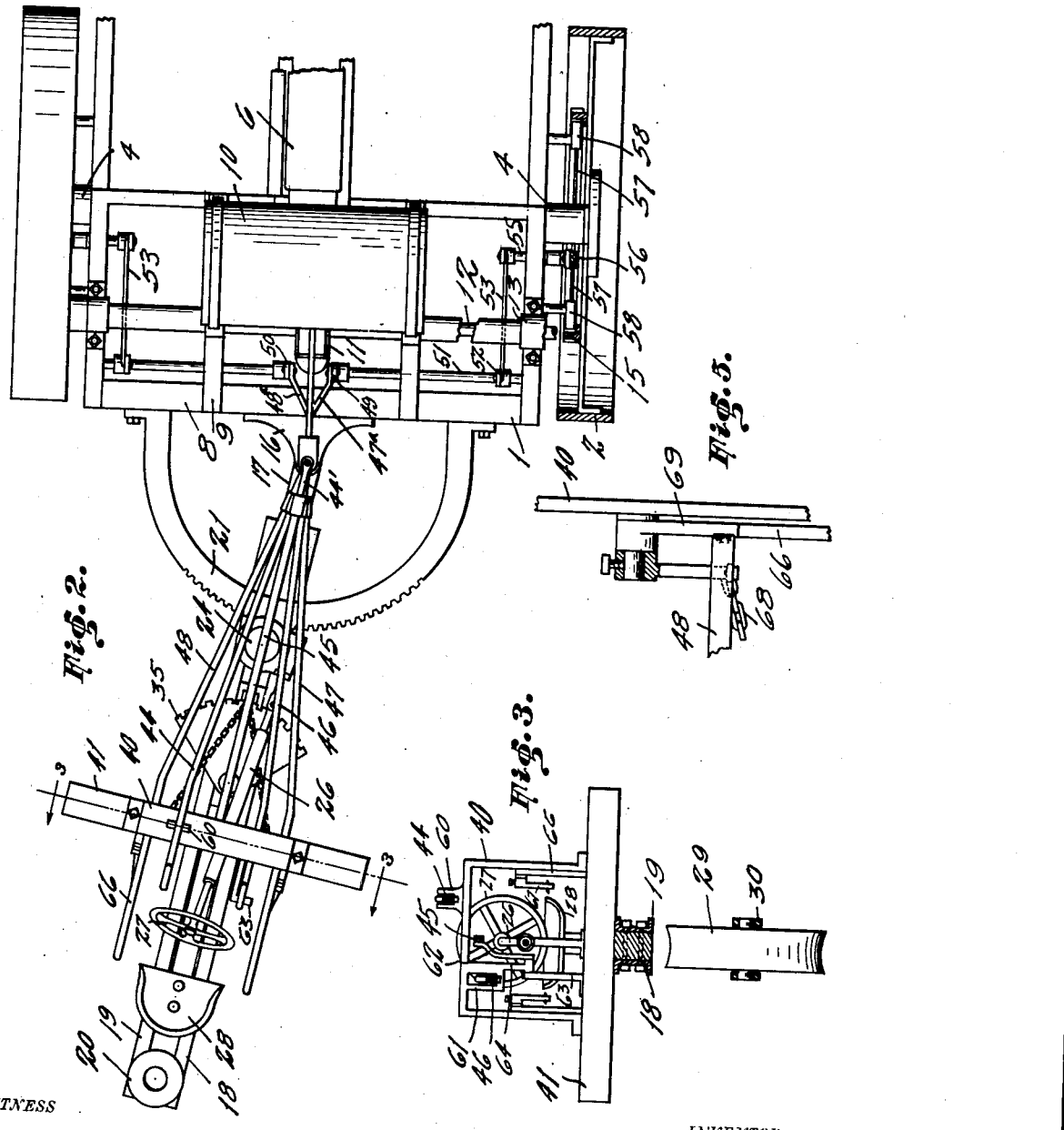

WILLIAM B. CHENOWETH, OF FORT WORTH, TEXAS, ASSIGNOR, BY MESNE ASSIGNMENTS, TO BENJAMAN TRACTOR COMPANY, OF DALALS, TEXAS, AN ASSOCIATION HAVING AS ITS TRUSTEES S. A. McILHENNY, W. B. CHENOWETH, JACK A. SCHLEY, AND GEORGE W. TAMSITT, ALL OF DALLAS COUNTY, TEXAS.

TRACTOR TURNING MECHANISM.

1,331,185.  Specification of Letters Patent.  Patented Feb. 17, 1920.

Application filed July 29, 1918. Serial No. 247,311.

*To all whom it may concern:*

Be it known that I, WILLIAM B. CHENOWETH, a citizen of the United States, residing at Fort Worth, in the county of Tarrant and State of Texas, have invented certain new and useful Improvements in Tractor Turning Mechanism, of which the following is a specification.

This invention relates to new and useful improvements in turning mechanisms for tractors.

The particular aim of the invention is the production of a tractor which will be capable of making a turn at any angle up to a right angle and which includes means for locking one of the driving ground wheels against revolution whereby it becomes a pivot point for an arc in which the other wheel travels.

In carrying out the invention elements are provided which when brought into use will produce a braking action on the ground wheel which is selected thus locking the same against revolution. This is carried out in connection with a trailer unit which is supported on a trailer wheel which may be locked against lateral adjustment. It is proposed to arrange the parts so that when the braking action is effected the trailer wheel may be freed so as to swing laterally and permit the trailer unit to participate in the short turn. It is proposed to construct the turning mechanism also so that it may be used as a brake if desired.

The invention will be more readily understood from a reading of the following specification and by reference to the accompanying drawings, in which an example of the invention is illustrated, and wherein—

Figure 1 is a side elevation of a tractor equipped with this invention,

Fig. 2 is a partial plan view of the same,

Fig. 3 is a transverse sectional view on the line 3—3 of Fig. 2,

Fig. 4 is a transverse sectional view on the line 4—4 of Fig. 1.

Fig. 5 is a detail of one of the adjusting lever mechanisms, and

Fig. 6 is a sectional detail of the trailer wheel lock.

This application forms a companion case to an application filed July 1, 1918, Ser. No. 242,834, relating to the tractor which is also described and illustrated in this application.

In the drawings the numeral 1 designates the main horizontal frame of a driving unit which is supported on ground wheels 2. Subbeams 3 are suspended under the side beams of the main frame and axle journals 4 for the wheels 2 are supported between the beams 3 and the frame 1 and connected to these parts. The rear ends of the beams 3 terminate flush with the rear end of the frame 1 and these parts are connected and spaced apart by a plate 5. On the forward portion of the frame 1 a suitable motor 6 together with its usual accessories is mounted. This motor is connected with a clutch and transmission structure 7 which is supported on cross beams 8 and short longitudinal bars 9 which latter are carried by the beams 8. A fuel oil tank 10 is supported on the beams 9. A worm gear mechanism 11 is connected with the transmission and imparts motion to a transverse drive shaft 12 which is housed and supported in bearings 13 at each side of the frame 1. The shaft 12 carries at each end a pinion 14 which meshes with a large gear 15 secured to the adjacent ground wheel 2. This describes in a general way the driving mechanism of the driving unit and no claim is made to the particular structure of the motor transmission and driving elements as they may be selected from a wide range of manufacture.

At the center of the driving or motor unit is mounted a trunnion block 16 having its trunnion or pivot members in vertical alinement. This block is bolted to the plate 5 and has its extremities fitting in a yoke 17 directed rearwardly therefrom and pivoted thereto. The yoke forms a connecting end of a trailer unit which includes a longitudinal rearwardly extending beam 18 preferably formed of spaced channel irons 19 with their straight sides adjacent. The yoke is secured between the forward ends of the channel irons while a turn table 20 is mounted at the rear ends of the same and provides means for attachment of a trailer, machine or implement.

A large gear segment 21, having its center coincident with the pivot points of the trunnion block and yoke, is fastened to the plate 5 and projects over the beam 18. A pinion 22 mounted on a support 23 meshes with the segment 21 and is operated by a worm gearing mechanism 24, which has connection by means of a universal joint 25 with a steering shaft 26 carrying a steering wheel 27 in convenient relation to a driver's seat 28. When the steering wheel is revolved the pinion 22 is rotated and travels on the segment 21 which is adjacent to the trailer unit laterally whereby the beam 18 extends at an angle to the longitudinal center of the tractor.

The beam 18 is supported by a follower or trailer wheel 29 which is mounted in a yoke 30 which has a pivot stud 31 extending up through a bearing block 33 disposed between the channels 19 and secured thereto by bolts 34. The stud 31 projects above the beam 18 and carries a locking sector 35 which projects forward. A latch 36 is pivoted in a bracket 37 which is mounted on the beam 18. The latch 36 normally engages in the teeth of the sector 35 and locks the same against rotation whereby the wheel 29 is locked against lateral adjustment.

It will be seen that when the sector 35 is locked so as to hold the wheel parallel with the beam 18 said beam will trail behind the driving unit and follow the same. It is obvious that the line of draft of the wheels 2 and 29 will be parallel and the adjustment of the beam will be maintained. Tools or implements attached to the beam may be operated on either side of the tractor or even laterally with the ground wheels 2.

A controlling stand 40 is mounted on a transverse bar 41 supported on the beam. The stand 40 supports the controlling elements for the motor and the driving unit. Bars 44, 45 and 46 are disposed in superposed order, as shown in Fig. 1. Below these are similar bars 47 and 48 which are opposite each other. Each of the bars has telescoping thereinto a shank which I have designated by the numerals 44', 45', 46', 47' and 48' respectively. The shank 44' has jointed connection with a rod 44$^a$ which is suitably connected with the throttle of the motor 6. The shank 45' is connected with a rod 45$^a$ which is connected with the clutch mechanism in a suitable manner. The shank 46' is connected with a rod 46$^a$ which is suitably connected with the transmission mechanism 7. The shanks 47' and 48' are connected respectively to laterally bent rods 47$^a$ and 48$^a$.

The rods 47$^a$ and 48$^a$ control mechanisms which while individual and separate are duplicates and a description of one will suffice for both. The rod 47$^a$ has connection with a lever 49. A horizontal rock shaft 51 is mounted under the frame 1 and the lever 49 is fixed to its inner end. An upstanding arm 52 is fixed on the shaft 51 and is pivoted to the rear end of a link 53 which is pivoted at its forward end to a lever 54 mounted on the inner end of a shaft 55 which carries a brake expanding member 56 on its outer end. The member 56 is disposed within the gear and has pivoted to diametrically opposite points the inner ends of links 57 which are pivoted at their outer ends to brake shoes 58 suspended from brackets 59 mounted on the outside of the frame 1. The shoes when spread apart or forced outward by the expander 56 engage the inner periphery of the gear 15 and fasten the wheel 2 against revolution, it being understood that the wheel has the usual pawl and ratchet connection with its axle as is common in this art. This braking mechanism is used for making short and square turns. It will be seen that if one of the wheels is locked against revolution and the trailer member swung to the limit of its lateral adjustment the locked wheel becomes a pivot point of an arcuate path traveled by the other wheel in making a square turn. The bar 44 is provided with teeth which engage in a keeper 60 on top of the stand 40; while the bar 46 is provided with teeth engaging in a keeper 61 depending within the stand. Either bar may be lifted to disengage the teeth and adjusted longitudinally to operate the parts controlled thereby. The bar 45 is pivoted to the upper end of an arm 62 connected with a clutch lever 63 pivoted in a hanger 64. Each upright of the stand carries a rearwardly projecting locking segment 65 and a lever 66 each of which has a depending arm 67 from which a chain 68 extends to the latch 36. Each lever 66 also has an integral depending arm 69. One of the arms 69 has connection with the rear end of the bar 47, and the other arm 69 has connection with the rear end of the bar 48. By pulling either lever upward the bar connected therewith is pulled rearward and at the same time one of the chains 68 is pulled whereby the latch 36 is swung out of the sector 35 so that in making a short turn the wheel 29 may trail properly. It will be noted as indicated in Fig. 5 that the lever 67 is adjustable and could be pointed either up or down. The stand 40 and its base 41 are adjustable longitudinally of the beam 18, and for this reason telescoping shanks are provided in order that the connections may be lengthened or shortened. A supporting standard 70 is mounted on the yoke 17 and supports the rods which are jointed to the shanks.

It will be seen that if the driver wishes to make a turn he reaches down and grasps one of the levers 66 on the side of which he wishes to turn. By pulling the lever upward the arm 69 thereof is pulled rearward whereby the bar 47, for instance is pulled rearward which through its connections swings the lever 49 rearward which rocks the shaft 51 and swings the parts connected thereto as hereinbefore described, so that the expander 56 is rocked. By this means the parts 57 are pushed in opposite directions so that the shoes 58 are tightly engaged with the inner surface of the gear 15 thus locking the respective wheel 2 against revolution. When the lever 66 was swung up the arm 67 attached thereto was also swung so that one of the chains 68 was pulled so as to swing the latch 36 out of engagement with the sector 35. By using the chains either lever can be operated without affecting the other. When the sector is released the yoke 30 and ground wheel 29 are free to swing laterally. The driver by means of the steering gear adjusts the trailer unit so that it swings at an acute angle to the driving unit and the trailer wheel adjusts itself to an arc in harmony with the arc traveled by the free ground wheel of the driving unit. It is obvious that a very short turn may be made and the unplowed ground reduced to a minimum.

By pulling up both levers 66 both ground wheels may be locked against revolution so that an efficient brake is had. When the levers are lowered the movement of the parts is reversed, the brakes released and the latch free to engage the sector. Sufficient slack may be left in the rods 47ª and 48ª and their connections so that a slight upward movement of either lever 66 will disengage the latch 36 without applying the brakes.

The levers 66 may be used to steer the tractor instead of the steering wheel and gear. A very slight application of the brake shoes will lock the selected wheel which becomes idle through the differential and the other wheel still being under power will begin to turn. When the tractor has been turned to the desired point the wheel may be released and a straight course taken.

What I claim is:

1. In a tractor turning mechanism, a driving unit, a trailer unit pivoted to the driving unit, a swivelly-journaled caster wheel carried by the trailer unit and normally locked to travel in a forward path, means for unlocking the caster wheel when the driving unit is turned, and means for turning the trailer unit on the driving unit.

2. In a tractor turning mechanism, a driving unit mounted on ground wheels, a trailer unit pivoted to the rear of the driving unit, a swivelly-journaled caster wheel on said trailer unit normally locked to travel in a forward path, a differential mounted on the driving unit, individual driving connections between the differential and the ground wheels, brake members carried on the ground wheels, brake shoes engaging the brake members, and means for unlocking said caster wheel and at the same time operating the brake shoes of one wheel separately from those of the other wheel.

3. In a tractor turning mechanism, the combination with a driving unit mounted on ground wheels, of a trailer unit connected to the driving unit and having a trailer wheel, an individual braking device for each ground wheel whereby each ground wheel may be separately locked against revolution, means mounted on the trailer unit for individually operating the braking devices, and means for locking the trailer wheel against lateral adjustment arranged to be released when one of the ground wheels is locked against revolution.

4. In a tractor turning mechanism, the combination with a driving unit mounted on ground wheels, of a trailer unit connected to the driving unit and having a trailer wheel, an individual braking device for each ground wheel whereby each ground wheel may be separately locked against revolution, means mounted on the trailer unit for individually operating the braking devices, and means for normally locking the trailer wheel against lateral adjustment connected with the braking device operating means so as to be operated thereby to free the trailer wheel.

5. In a tractor turning mechanism, a driving unit mounted on ground wheels, a motor for turning said wheels, a differential between the motor and wheels, brake means to lock either wheel separately against rotation, a trailer unit pivoted to said driving unit, a caster wheel swivelly journaled on said trailer unit, a latch for locking said caster wheel to travel in a forward path, brake-operating means on the trailer unit, and flexible connections between said brake-operating means and said latch for releasing the latter when the brake means is applied to either ground wheel.

6. In a tractor turning mechanism, a driving unit mounted on ground wheels, a trailer unit pivoted to the rear of the driving unit, a motor for turning the wheels, a differential between the motor and wheels, brake means to lock either wheel separately against rotation, a caster wheel swivelly-journaled on said trailer unit, a notched part turning with said caster wheel, a pivoted latch normally in engagement with said notched part to hold the caster wheel from swiveling, a pair of levers on said trailer unit separately connected to control the individual brake means, flexible connections between said levers and said latch, and means for swinging the trailer unit about the driving unit.

In testimony whereof I affix my signature.

WILLIAM B. CHENOWETH.